United States Patent [19] [11] Patent Number: 4,659,407
Lacotte et al. [45] Date of Patent: Apr. 21, 1987

[54] PROCESS FOR MANUFACTURING OPTICAL DISKS BY PRESSING

[75] Inventors: Jean-Pierre Lacotte, Villeneuve la Garenne; Sylvain Kretschmer, Paris; Pierre Oprandi, Villiers le Bel; Georges Broussaud, Sceaux, all of France

[73] Assignee: Thomson-CSF, Paris, France

[21] Appl. No.: 627,096

[22] Filed: Jul. 2, 1984

[30] Foreign Application Priority Data

Jul. 4, 1983 [FR] France ................ 83 11071

[51] Int. Cl.[4] .............................. B32B 31/20
[52] U.S. Cl. .................... 156/196; 156/219; 156/220; 156/221; 156/222; 156/228; 156/242; 156/245; 264/106; 264/107; 346/135.1
[58] Field of Search .............. 156/196, 209, 219, 220, 156/221, 222, 228, 242, 245; 264/106, 107; 346/135.1, 137

[56] References Cited

U.S. PATENT DOCUMENTS

| | | | |
|---|---|---|---|
| 2,606,851 | 8/1952 | O'Mahony et al. | 264/107 |
| 3,687,769 | 8/1972 | Dague | 264/107 |
| 4,288,481 | 9/1981 | Birt et al. | 264/107 |
| 4,315,878 | 2/1982 | Dover et al. | 156/219 |
| 4,440,586 | 4/1984 | Lippits et al. | 346/135.1 |

Primary Examiner—Caleb Weston
Attorney, Agent, or Firm—Oblon, Fisher, Spivak, McClelland & Maier

[57] ABSTRACT

The invention provides a process for manufacturing optical disks by pressing and disks obtained by such a process, for improving the inherent flatness of the optical disk of the thick type, obtained by a process of pressing between a recorded master and another master, recorded or not depending on whether it is a question of a single or double side disk, this latter being formed from a stack of at least two thin sheets of thermoformable material subjected to a pressure-temperature cycle after which bonding together of the sheets and duplication of the information from the masters for information recording are obtained.

7 Claims, 3 Drawing Figures

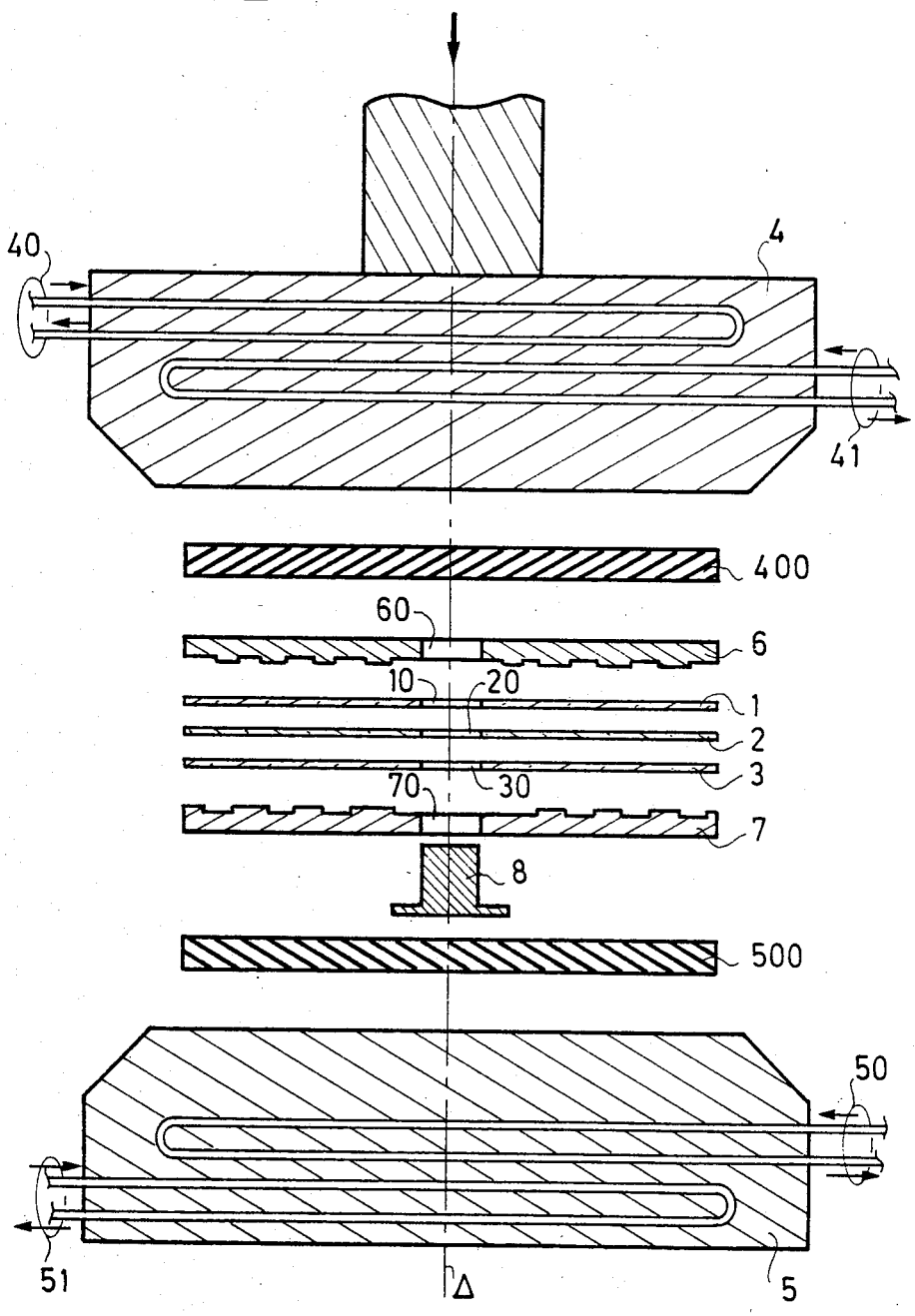

PROCESS FOR MANUFACTURING OPTICAL DISKS BY PRESSING

BACKGROUND OF THE INVENTION

The present invention relates to optical disks, that is to say disks on which information data is recorded, this data being readable by means of a focused ray beam. This data may represent video information, i.e. image, sound and data signals or purely digital information in data processing or analog signal digitalization applications. The invention relates more particularly to a process for manufacturing such disks.

Optically readable disks are generally such that the information is recorded on a track in the form of micro-reliefs whose width is of the order of a micrometer and whose length is fixed or variable depending on the recording process. This track may have the form of concentric circles or may be a spiral track, the pitch between the grooves in the radial direction being between 1.5 and 2 micrometers. Such disks allow a great amount of optically readable information to be recorded. Reading is obtained by diffraction of radiation concentrated on the plane containing the information when the disk is rotating, the reading device comprising radial and vertical movement control devices for maintaining the focusing tip of the reading beam on the track. Reading may be carried out by transmission or reflection.

The disk may comprise one or two recorded faces.

Though an original recording may be obtained directly by a process using recording means also comprising a focused ray source, the same can not be said for duplicating this recording.

In fact, if a number of copies of this recording is desired, it is then necessary to use processes based on duplication using one (monoface disk) or two masters (double face disk) reproducing the original recording. Numerous methods have been proposed in the prior art.

Two types of disks may be generally distinguished, at least in so far as the thickness is concerned; these are called "thick" disks, that is to say having typically a thickness greater than about 300 micrometers, as opposed to so called "thin" disks. Although this distinction is essentially conventional, it corresponds, considering the techniques and materials used, to technological difficulties of different magnitudes met with during the manufacturing procedure.

In so far as the "thick" disks are concerned, there exist two main thermal processes:

a compression process which consists in placing a preheated blank of thermoformable material between two masters one at least of which carries an impression to be duplicated, and heating and pressing until the material has flowed and has taken on the whole of the impression; the thickness of the disk is determined by a compromise between the pressure exerted and the fluidity of the thermoformable material;

an injection process which consists in forcing under a very high pressure an amount of paste of a thermoformable material for filling the space existing between two masters; the thickness of the disk obtained is determined by the compromise between the pressure exerted and the fluidity of the thermoformable material.

In so far as the "thin" disks are concerned, a third method may be added to the two previously mentioned methods which is generally called stamping which consists in placing a sheet of thermoformable material between the two masters carrying the information. The surface is softened by a temperature-pressure cycle so that the impression may be taken up. The final thickness of the disk is determined by the thickness of the sheet.

Finally, for all types of disks, in addition to the above mentioned thermal methods, a different method appeared a few years ago which consists in photopolymerizing, in the presence of radiation in the ultra violet range, a photosensitive material deposited on the substrate by coating and on which the master copies the information while the photopolymer material is still liquid. The thickness obtained is in general slightly greater than the thickness of the substrate.

Experience has shown that the most difficult problem to resolve for obtaining a disk of good quality is certainly that of the inherent flatness of the disk.

The type of inherent flatness naturally influences the final quality of a disk. It is relatively easy to correct a defect which is in the form of a single undulation per revolution or buckling, even of large amplitude, by means of the servomechanisms with which the reading means are provided. In fact, in this case, the defect is associated with a very low frequency for which the gain of the servomechanisms is at its maximum.

On the other hand, when the number of defects, even of relatively small amplitudes, is high and they are distributed in a random fashion, the gain of the servomechanisms decreases because of their limited pass bands and these defects cannot be corrected. It is then necessary to obtain a surface quality condition sufficient to overcome this phenomenon.

The compression or injection processes which require high power presses often introduce very high stresses into the materials and at the present time the best compromise between all the specifications and in particular those related to optical parameters, leads to using methyl polymethachrylate ("PMMA").

The photopolymerization method which is certainly less restrictive, both for the material of the disk and for the masters, requires even so the use of a good quality substrate. Now, this latter is often obtained by injection or compression and so the same difficulties arise at the time of its manufacture.

As opposed to that, the stamping method is advantageous first of all because pre-pressing may be carried out with masters without information so as to improve the inherent flatness but also because there is practically no movement of material under the master. This method gives good results for thin films typically less than 300 micrometers as was mentioned above. When it is desired to use greater thicknesses, these are "plates" and no longer films. The "plates" generally have a fairly mediocre inherent flatness and this method is inapplicable to so called "thick" disks.

The invention relates to the manufacture of disks of this latter type and aims at overcoming the difficulties which have just been set forth.

To this end, the object of the invention is then an optical disk obtained by this process.

BRIEF SUMMARY OF THE INVENTION

The invention provides then a process for manufacturing optical disks of a given thickness recorded on at least one face by means of a compression press comprising a pair of jaws, movable with respect to each other and each supporting respectively a first recorded master and a second master, countermaster or recorded master, which process comprises a step consisting in disposing between the masters a stack of at least two sheets of a thermoformable material whose total cumulated thickness is equal to said given thickness and steps for subjecting this stack to a pressure-temperature cycle, said pressure being exerted by drawing together the jaws of the press for compressing the stack of thermoformable material sheets and the temperature cycle comprising raising of the temperature from an ambient temperature so as to exceed the softening point of the material and returning to ambient temperature; so as to obtain, after these steps, the bonding together of the sheets forming said stack and duplication of the recording of each master recorded on one of the main faces of the stack.

BRIEF DESCRIPTION OF THE DRAWINGS

The invention will be better understood and other features and advantages will appear from the following description with reference to the accompanying Figures in which:

FIG. 2 illustrates schematically a press; and

DETAILED DESCRIPTION OF THE PREFERRED EMBODIMENTS

A fundamental aspect of the process of the invention, is to associate together several sheets of a thermoformable material film, stacked on each other and to transfer the information by the stamping process. Thus thick disks may be obtained whose thickness is determined by the sum of the thicknesses of the stacked films, having excellent inherent flatness and simultaneously allowing inexpensive material to be used such as polyvinyl chloride (PVC).

Furthermore, as will be described in greater detail hereafter, the process of the invention is compatible with using a conventional press.

The step of the process of the invention will now be described in greater detail.

It comprises a preliminary phase for creating at least one master comprising, on one of its main faces a "negative" recording representing the information to be duplicated. If it is a question of a double side disk, two masters must of course be created associated with the two faces of the disk. These masters are firmly secured to the jaws of the press.

This phase is entirely common with the known art and does not require further description.

The steps proper to the process of the invention begin by inserting a stack of thermoformable material sheets between the jaws of the press supporting their respective masters.

For a continuous process, this stack of sheets may be formed by a stack of strips of a width at least equal to the diameter of the disks to be formed, which stack travels step by step between the jaws of the press so that a copy of the recording on the masters is provided at each cycle.

In another variant, each sheet may be formed by a preform, roughly cut to the dimension of the disk to be formed and which may be pre-pierced with a central aperture which will serve for centering during a final step during which the disk is cut to its final dimensions.

The number of sheets in the stack is determined naturally, as has been mentioned, by the final thickness of the disk to be obtained. Preferably, all the sheets are of the same material.

By way of example, an optical disk has typically a thickness of 1.2 mm and the films are made from polyvinyl chloride.

Figure 1:
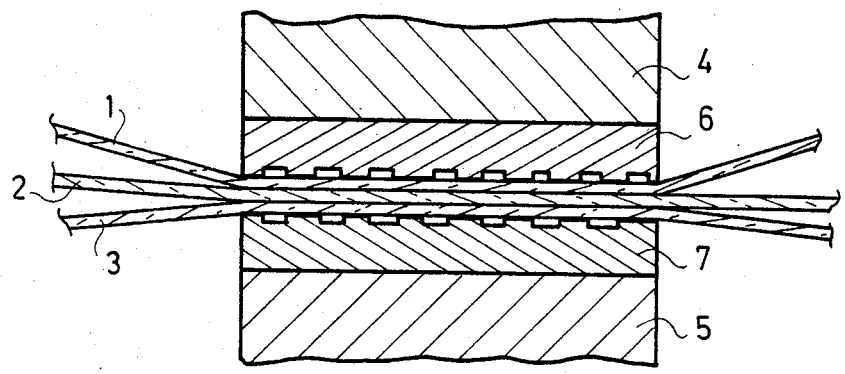
FIG. 1 illustrates one of the steps of the process of the invention.

Then as shown schematically in FIG. 1, similarly to the prior art, the stack of sheets or films is subjected to a "temperature-pressure" cycle. However, this step has the specific character of simultaneously transferring the recording onto one of the main end faces of the stack of films and bonding of the different films of the stack together. This latter action is due to the thermoformable quality of the material used.

In FIG. 1 a stack of three sheets has been shown in the form of continuous strips 1, 2, and 3 which have been inserted between two jaws 4 and 5 of a press, each supporting a master 6 and 7 to be duplicated. If a single side disk is desired, a single master is recorded and the other master, or countermaster is smooth.

By way of example, the temperature to which the stack is subjected is of the order of 150° C. It should not be too high so as to avoid degradation of the intrinsic qualities of the material used. The pressure, applied perpendicularly to the planes formed by the thermoformable material films, may be chosen in the range between 30 and 40 kg.cm$^{-2}$, for a typical period of 20 to 60 seconds. Heating is obtained by using means for heating the jaws.

Finally, the assembly, is cooled down to ambient temperature, which cooling step fixes the transferred recording, similarly to the prior art and so as to make permanent the bonding together of the different films of the stack.

The return to ambient temperature takes place during a length of time depending on the cooling capability of the jaws.

If the disk is not cut to shape and the central hole not pierced simultaneously with the recording step, the process comprises additional steps for carrying out these operations, in a way identical to the prior art.

In the majority of cases, following these steps of the process of the invention, the product obtained, namely an optical disk of predetermined thickness, has sufficient inherent flatness for most applications, that is to say a flatness of the order of a micrometer for short spatial periods (less than 10 cm).

However, the inherent flatness may be further improved by using two variants of the process, which variants comprise additional steps.

A first variant comprises a step for pre-pressing the sheets of the stack individually. For this, the sheets are subjected to a temperature-pressure cycle similar to the one which has just been recalled, during which each sheet is disposed between two smooth jaws of the press or, more generally, between smooth masters or similar members.

In a second variant, the complete stack of sheets undergoes such a treatment as a whole. In this case, the sheets are also bonded to each other during these additional steps. Then the stack thus formed is subjected to a new temperature-pressure cycle, but essentially for duplicating the information.

As has been mentioned, and this forms an additional advantage of the process of the invention, this process is compatible with the use of the presses used in the prior art.

Such a press will now be described briefly so as to illustrate the invention more completely with reference to FIG. 2.

In this Figure only the main parts have been shown which are required for manufacturing disks in accordance with the process of the invention.

The press comprises first of all an upper movable jaw 4 and a lower jaw 5 very often integrally secured to a fixed frame not shown. Under the action of pressure forces, the upper jaw is moved towards the lower jaw in a direction parallel to an axis orthogonal to the main facing faces of the two jaws. These faces are flat. Between the two jaws 4 and 5, as already mentioned, there are disposed, on the one hand, a set of masters to be duplicated 6 and 7 having centering orifices 60 and 70 and, on the other hand, the stack of thermoformable material sheets.

In the example illustrated, these sheets are formed from three disk preforms 1 to 3, having pre cut-out centering orifices 10 to 30.

In actual fact, the masters are not generally in direct contact with the jaws but through sheets 400 and 500 made from a resilient material forming a cushion so as to distribute more evenly the pressure forces exerted on masters 6 and 7 and the stack of thermodeformable sheets 1 to 3.

Finally, a centering piece 8 is also provided on which the masters 6 and 7 and the preforms 1 to 3 are fitted.

Several means have been proposed for raising the temperature of the jaws, communicated to sheets 1 to 3. By way of example, these means may be formed by electric heating resistances.

However, considering the thermal inertia generally presented by these jaws, it is difficult to bring them rapidly to the desired temperature.

In the press construction shown in FIG. 2, it is preferred to heat by a flow of dry vapor circulating in a coil within each jaw, respectively coils 40 and 50.

High frequency electromagnetic wave heating may also be considered which causes dielectric losses.

Cooling, that is to say lowering to ambient temperature, may be obtained also be causing water or a fluid to flow in coils disposed within jaws 41 and 45, respectively in FIG. 2.

Figure 3:
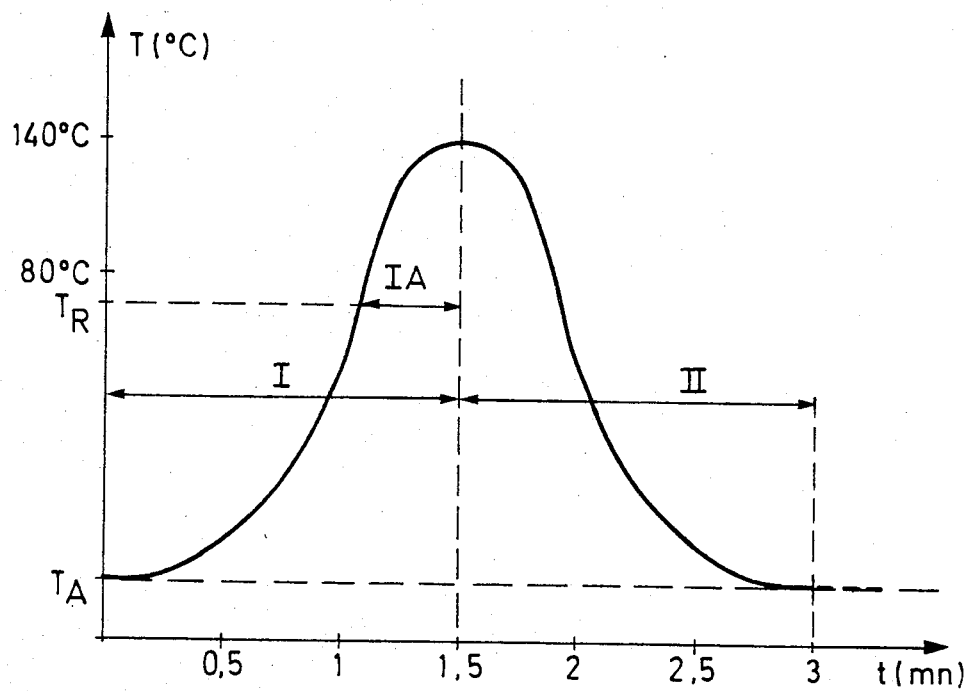
FIG. 3 is a diagram showing a typical heating-cooling cycle of the thermoformable material.

FIG. 3 is a diagram illustrating a typical heating-cooling cycle obtained with such a press. The dry vapor is caused to flow in coils 40 and 50. The temperature is brought up to the required level in a period I of about 1.5 minutes, after which an average temperature of 140° C. is obtained.

The pressure on the stack of sheets is applied from the beginning of the cycle.

From a temperature a little less than 80° C., with the softening point of the material forming the sheets of the stack being reached, polyvinyl chloride in the example illustrated, application of the information, that is to say taking of the impression by the material and bonding are effected: time interval IA.

Then, the dry vapor intake is stopped and the cooling liquid is caused to flow in coils 41 and 51. The time required for lowering to ambient temperature is equal or of the same order of size as that required for bringing up to the required temperature, 1.5 minutes in the example illustrated.

The invention is naturally not limited to the sole examples explicitly described by way of illustration but extends to all variants within the scope of a man skilled in the art. In particular, other thermoformable materials may be used. The number and thickness of the sheets of the stack may be widely varied, this number being at least equal to two.

What is claimed is:

1. A process for manufacturing optical disks wherein reading of the disks may be carried out by transmission or reflection, said disks having given thickness greater than 300 micrometers and being recorded on at least one face by means of a compression press comprising a pair of jaws movable with respect to each other, each supporting respectively a first recorded master and a second master, countermaster or recorded master, said process comprising a step of positioning, between the masters, a stack of at least two sheets of identical thermoformable material closely placed in touch with each other whose total cumulated thickness is equal to said given thickness and the steps of subjecting this stack to a pressure-temperature cycle, said pressure being exerted by bringing the jaws of the press together for compressing the stack of thermoformable sheets and the temperature cycle comprising raising the temperature from ambient temperature so as to exceed the softening point of the material and returning to ambient temperature; so as to obtain, after these steps, bonding together of the sheets forming said stack and duplication of the recording on each recorded master on one of the main faces of the stack.

2. The process as claimed in claim 1, wherein said bonding and said duplicating of the recording are obtained simultaneously during raising of the temperature of the thermoformable material beyond said softening point.

3. The process as claimed in any one of claims 1 or 2, comprising an additional initial step during which each sheet of the stack is subjected to a pressure-temperature cycle between two smooth masters during which the temperature is raised from the ambient temperature to a temperature higher than the softening point of the thermoformable material forming it and brought back to the ambient temperature so as to improve the inherent flatness thereof.

4. The process as claimed in claim 1, further comprising an initial additional step during which the complete stack of the sheet of thermoformable material is subjected to a pressure-temperature cycle between two smooth masters during which the temperature is raised from the ambient temperature to a temperature greater than the softening point of the thermoformable material and brought back to ambient temperature, bonding together of the sheets of the stack being achieved after this step.

5. The process as claimed in claim 1 wherein each sheet of thermoformable material has a thickness of 150 micrometers.

6. The process as claimed in claim 1 wherein each sheet of thermoformable material is formed by a disk pre-form having a diameter greater than that of the optical disk to be produced and comprising a centering orifice pre cut-out for aligning the pre-forms with respect to each other so as to form said stack.

7. The process as claimed in claim 1 wherein said thermoformable material is polyvinyl chloride.

* * * * *